United States Patent
Furumoto (10) Patent No.: US 11,862,027 B2
(45) Date of Patent: Jan. 2, 2024

(54) FLIGHT PATH CALCULATION SYSTEM, FLIGHT PATH CALCULATION PROGRAM, AND UNMANNED AIRCRAFT PATH CONTROL METHOD

(71) Applicant: METROWEATHER CO., LTD., Uji (JP)

(72) Inventor: Junichi Furumoto, Uji (JP)

(73) Assignee: METROWEATHER CO., LTD., Kyoto (JP)

( * ) Notice: Subject to any disclaimer, the term of this patent is extended or adjusted under 35 U.S.C. 154(b) by 344 days.

(21) Appl. No.: 17/259,087

(22) PCT Filed: Jul. 9, 2019

(86) PCT No.: PCT/JP2019/027069
§ 371 (c)(1),
(2) Date: Jan. 8, 2021

(87) PCT Pub. No.: WO2020/013153
PCT Pub. Date: Jan. 16, 2020

(65) Prior Publication Data
US 2021/0319705 A1    Oct. 14, 2021

(30) Foreign Application Priority Data

Jul. 11, 2018    (JP) .................................. 2018-131283

(51) Int. Cl.
*G08G 5/00* (2006.01)
*B64C 39/02* (2023.01)
*B64U 101/60* (2023.01)

(52) U.S. Cl.
CPC ......... *G08G 5/0034* (2013.01); *B64C 39/024* (2013.01); *G08G 5/006* (2013.01);
(Continued)

(58) Field of Classification Search
CPC ...... G08G 5/003; G08G 5/0013; G08G 5/006; G08G 5/0069; G08G 5/0026;
(Continued)

(56) References Cited

U.S. PATENT DOCUMENTS

2016/0196753 A1    7/2016 Jarrell
2016/0253908 A1    9/2016 Chambers et al.
(Continued)

FOREIGN PATENT DOCUMENTS

JP    2008-124389    5/2008
JP    2010-67136    3/2010
(Continued)

OTHER PUBLICATIONS

Search Report dated Apr. 7, 2022 issued in European Patent Application No. 19834019.2.
(Continued)

*Primary Examiner* — Shon G Foley
(74) *Attorney, Agent, or Firm* — Cozen O'Connor (57) ABSTRACT

In an uninhabited aircraft flight management system 1, there is a three-dimensional map data storage section 172 for storing three-dimensional map data in horizontal and height directions where no ground objects exist and where an uninhabited aircraft 6 is allowed to fly, a current position acquisition section 175 for acquiring a current position, a transport instruction acquisition section 166 for acquiring a destination, a path calculation section 167 for calculating a path, a lidar data acquisition section 121 for acquiring wind condition data, a dangerous wind condition area judgement section 123 for calculating a warning area where flight should be avoided, from the wind condition data, and a path recalculation section 164 for recalculating the path avoiding the warning area when the path calculated by the path
(Continued)

calculation section 167 is one which passes through the warning area calculated by section 123.

6 Claims, 4 Drawing Sheets

(52) U.S. Cl.
CPC ......... *G08G 5/0056* (2013.01); *G08G 5/0069* (2013.01); *G08G 5/0091* (2013.01); *B64U 2101/60* (2023.01); *B64U 2201/10* (2023.01)

(58) Field of Classification Search
CPC .. G08G 5/0034; G08G 5/0043; G08G 5/0082; G08G 5/0039; B64C 39/024; B64U 10/13; B64U 2201/00; B64U 2101/60; H04B 7/18506

See application file for complete search history.

(56) References Cited

U.S. PATENT DOCUMENTS

| | | |
|---|---|---|
| 2017/0358224 A1 | 12/2017 | Priest |
| 2018/0090016 A1 | 3/2018 | Nishi et al. |

FOREIGN PATENT DOCUMENTS

| | | |
|---|---|---|
| JP | 2010-214979 | 9/2010 |
| JP | 2017-33232 | 2/2017 |
| WO | WO 2015/108154 | 7/2015 |
| WO | WO 2018/110088 | 6/2018 |

OTHER PUBLICATIONS

Reasons for Refusal dated Oct. 5, 2021 issued in Japanese Patent Application No. 2018-131283.

FLIGHT PATH CALCULATION SYSTEM, FLIGHT PATH CALCULATION PROGRAM, AND UNMANNED AIRCRAFT PATH CONTROL METHOD

RELATED APPLICATIONS

This is a U.S. National Phase Application under 35 USC 371 of International Application PCT/JP2019/027069 filed on Jul. 9, 2019.

This application claims the priority of Japanese application no. 2018-131283 filed Jul. 11, 2018, the entire content of which is hereby incorporated by reference.

FIELD OF THE INVENTION

Technical Field

The present invention relates to a flight path calculation system and a flight path calculation program such as for calculating a flight path of an uninhabited aircraft, for example, and a method for controlling the uninhabited aircraft path.

Background of the Invention

Conventionally, a Coherent Doppler Lidar (CDL) has been suggested, in which wind velocities and/or aerosol amount are acquired by irradiating a laser light into atmosphere and acquiring scattering from atmospheric dust (aerosol) with a telescope (refer to JP2008-124389).

On the other hand, in recent years, drones which can fly while their attitude being controlled in air have been provided. Such drones fly with their direction, speed and altitude changed according to an operator's control. The drone in flight is affected by wind. In addition, for example, when a drone which is proceeding straight is swept away by wind and left as it is, it will collide with a structure or remain on a different path. For this reason, the operator operates a controller to correct its trajectory. In this way, the drone can be flown properly.

However, such method requires the operator to constantly check flight status of the drone and correct its trajectory as appropriate, and thus, there has been a problem that the operator bears a great burden. In particular, there has been a problem that the smaller the size of the drone, the more susceptible it is to wind, and unless the trajectory is corrected speedily, it is more likely to collide with a structure especially when it is flown in an urban area.

SUMMARY OF INVENTION

In view of the aforementioned problems, the present invention aims to improve convenience by providing a flight path calculation system, a flight path calculation program, and a method for controlling an uninhabited aircraft path which allow a drone to fly without a need of human control, and considering effects of wind.

The present invention is characterized in a flight path calculation system, a flight path calculation program, and a method for controlling an uninhabited aircraft path comprising a three-dimensional map data storage section for storing three-dimensional map data in horizontal and height directions where no ground objects exist and where an uninhabited aircraft is allowed to fly, a current position acquisition section for acquiring a current position, a destination acquisition section for acquiring a destination, a three-dimensional path calculation section for calculating a path which allows for flight in the map data from the current position to the destination, a wind condition data acquisition section for acquiring wind condition data, a warning area calculation section for calculating a warning area where flight should be avoided from the wind condition data, and a three-dimensional path recalculation section for recalculating the path, avoiding the warning area when the path calculated by the three-dimensional path calculation section is a one which passes through the warning area calculated by the warning area calculation section.

The present invention allows the drone to be flown without the need of human control, and considering the effects of the wind.

DETAILED DESCRIPTION OF THE PRESENTLY PREFERRED EMBODIMENTS

An embodiment of the present invention will be described in the following with drawings.

Example 1

Figure 1:
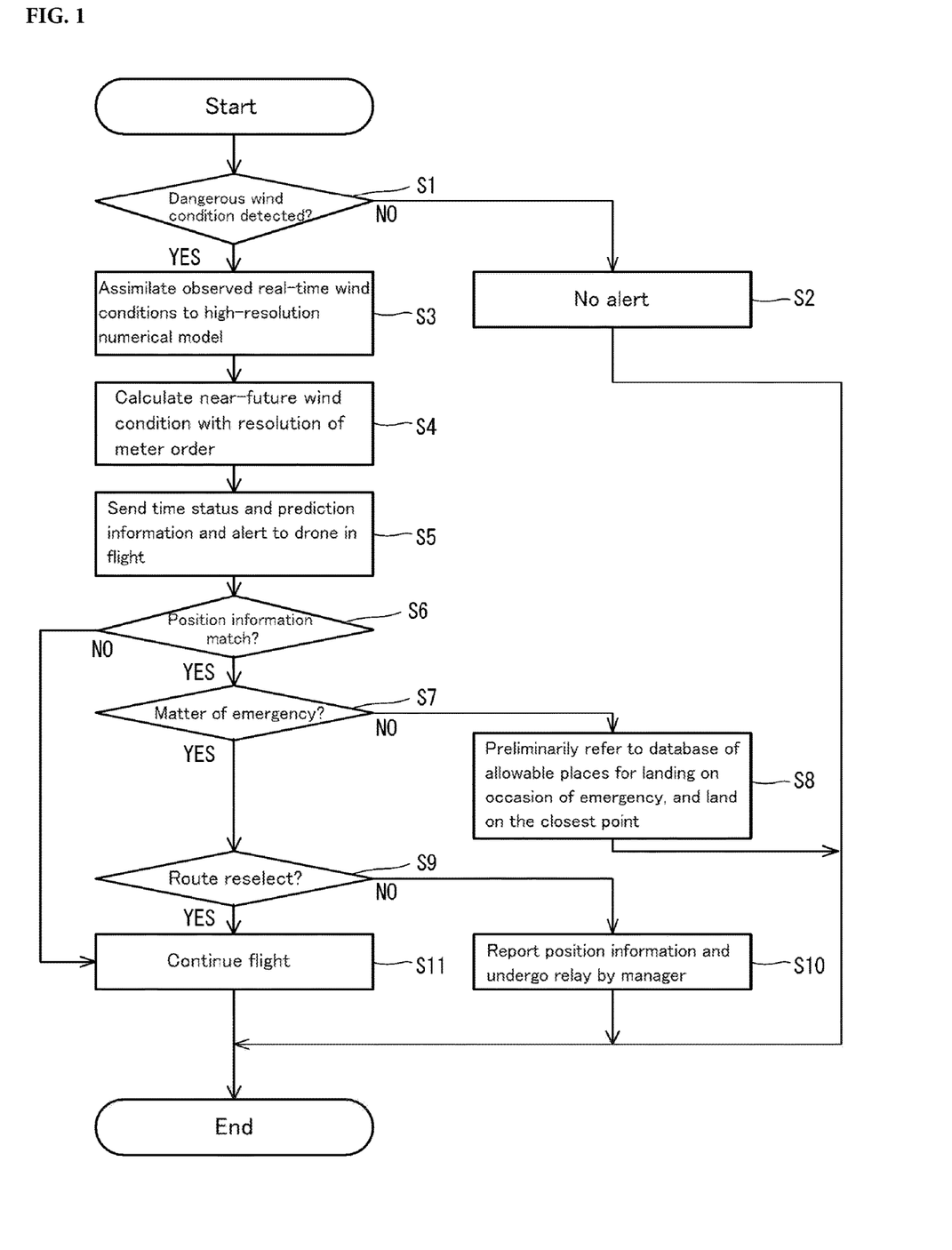
FIG. 1 is a block diagram showing a configuration of an uninhabited aircraft flight management system.

FIG. 1 is a block diagram showing a configuration of an uninhabited aircraft flight management system 1 (flight path calculation system).

The uninhabited aircraft flight management system 1 is configured with a management server 2, an operation terminal 4, a Doppler lidar 5, and an uninhabited aircraft 6, communicatively connected to the Internet 9.

The management server 2 comprises a control section 21, a storage section 22, an input section 23, a display section 24, and a communication section 25.

The operation terminal 4 comprises a control section 41, a storage section 42, an input section 43, a display section 44, and a communication section 45.

The Doppler lidar 5 comprises a control section for executing various controls, a laser light transmitting section for transmitting laser light, a reflected light receiving section for receiving reflected light for the laser light reflected by aerosol, and a data output section for outputting data. The laser light transmitting section transmits pulsed lasers of narrower-banded oscillating wavelengths horizontally over whole circumference of 360° and vertically upward at different transmission angles. The reflected light receiving section receives the reflected light scattered by the aerosol and subjected to Doppler shift, synthesizes this reflected light and a master laser from the laser light transmitting section on a mixer, amplifies a low-frequency beat signal among synthesized signal components with an IF amplifier (I.F. Amp.) and performs A/D conversion for the amplified signal with an analog/digital converter to create a digital signal. The data output section sends reflected light data, which is made as the digital signal by the reflected light receiving section, to an analysis device.

The management server 2 is configured with a server computer and the operation terminal 4 is configured with a personal computer. The management server 2 and the operation terminal 4 respectively comprises a control section (21, 41) configured with CPU, ROM, RAM, etc., as hardware elements for executing various calculations and control operations, a storage section (22, 42) configured with a hard disk or a flash memory, etc., for allowing reading/writing of data, an input section (23, 43) configured with a touch panel, a keyboard, a mouse, push buttons or a plurality of these for accepting input by contact operation, a display section (24, 44) configured with a liquid crystal display, an organic EL display or the like for displaying images such as characters and figures, and a communication section (25, 45) configured with a LAN board or a WIFI unit etc. for executing wired or wireless communication.

The storage section 22 of the management server 2 stores a management PG (program) 28 for managing flight status of the uninhabited aircraft 6, and a DB (database) 29 for storing observed wind condition data and off-limits area data which indicates off-limits areas etc.

The operation terminal 4 stores an operation PG (program) 48 for receiving inputs such as a transport item to be transported by the uninhabited aircraft 6 and destination of the item based on a user's operational input, and operational data 49 configured with the input destination, transport item and ID of the uninhabited aircraft 6.

The uninhabited aircraft 6 comprises a GPS unit 61 communicating with GPS satellite to acquire a current position, an altitude sensor 62 for detecting height in a direction of gravity from the earth's surface, an azimuth sensor 63 detecting an azimuth the aircraft is facing to acquire azimuth data, a camera 64 for taking pictures, at least from forward to downward, to acquire a photographic image (photographic screen image), a proximity sensor 65 for detecting proximity to an object, a human sensor 66 for detecting that a person is near, an attitude sensor 67 detecting attitude by a gyro mechanism to acquire attitude data, a control section 71 for performing various control actions, an attitude control section 72 for controlling number of revolutions of a motor 81 to stabilize the attitude, a communication section 73 for communication via the Internet 9, a light emitting section 74 for emitting light of a lamp to indicate a state, an audio output section 75 for outputting audio through a speaker, a storage section 76 for storing data, and a plurality of motors 81.

This uninhabited aircraft 6 can maintain its attitude stably by controlling drive of the motor 81 by the attitude control section 72 according to the attitude detected by the attitude sensor 67, and performs horizontal movement including forward and backward movement, horizontal rotation to change direction, vertical movement to change height, and movement in arbitrary directions for combined movement of the above, with precision, by the control section 71. In addition, actions necessary to safely transport the transport item are executed as appropriate such as, when the proximity sensor 65 detects that an object is in proximity, moving away therefrom, when the human sensor 66 detects that a person is nearby, moving away therefrom or outputs audio for alert by the audio output section 75, not moving any closer, or informing that it is in an emergency landing approach by means of the light emitting section 74 and the audio output section 75.

Figure 2:
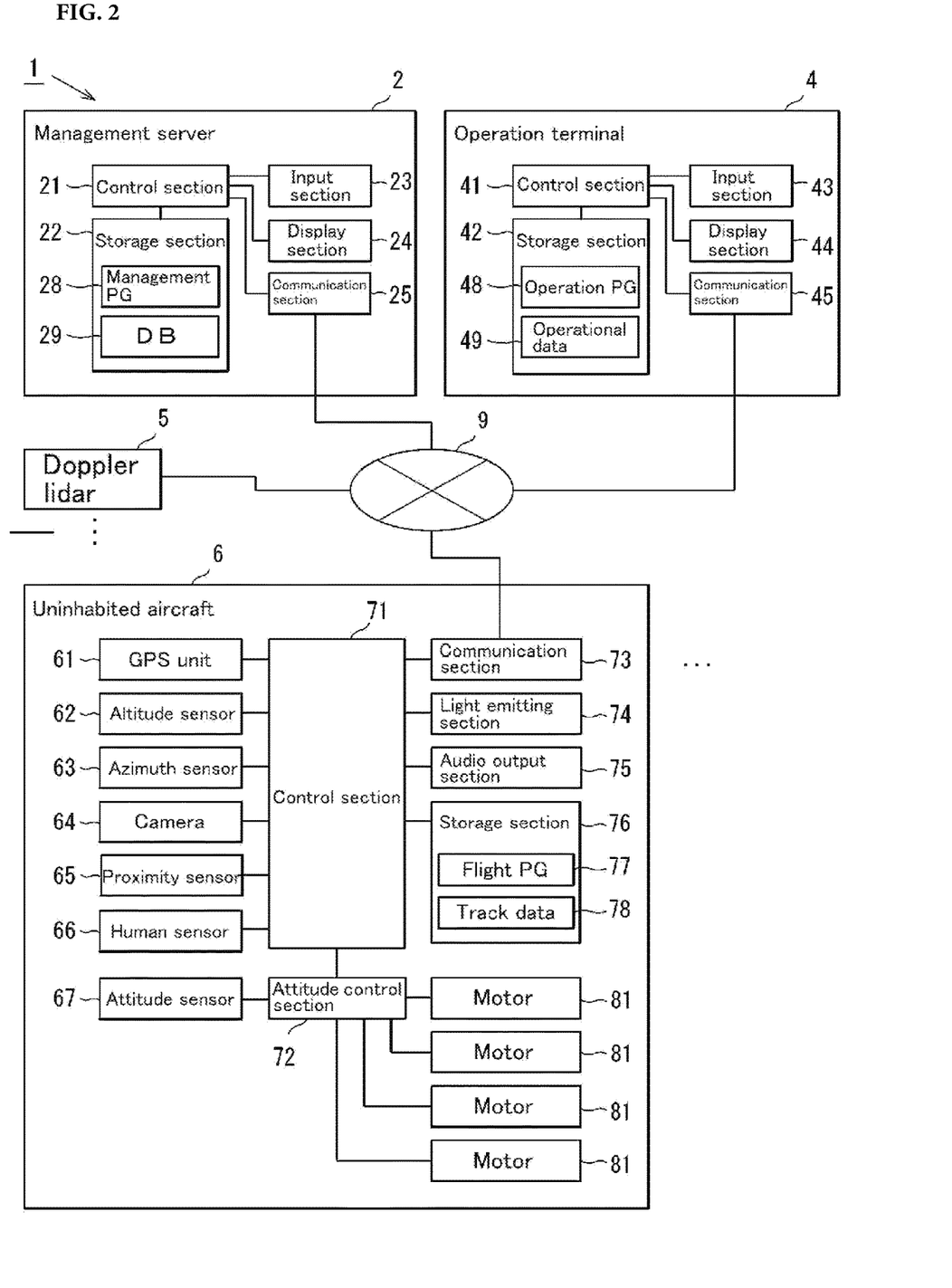
FIG. 2 is a functional block diagram of a management server, an operation terminal and an uninhabited aircraft.

FIG. 2 is a functional block diagram describing functions executed by the control section 21 of the management server 2, the control section 41 of the operation terminal 4 and the control section 71 of the uninhabited aircraft 6.

The control section 21 of the management server 2 functions as a lidar data acquisition section 121, a position-specific wind condition data calculation section 122, a dangerous wind condition area judgement section 123, a warning area data output section 124, an observed wind condition data storage section 125, a near-future wind condition data estimation section 126, an off-limits area calculation section 127, an off-limits area storage section 128, an off-limits area output section 129, and an uninhabited aircraft flight status management section 131.

The lidar data acquisition section 121 acquires observation data from a plurality of Doppler lidars 5 installed at different positions. The observation data include latitude data, longitude data and line-of-sight wind data in observation range of each Doppler lidar 5. Further, the line-of-sight wind data is wind velocity data of components in laser light irradiation direction, which is the line-of-sight direction of the Doppler lidar 5.

The position-specific wind condition data calculation section 122 analyzes the observation data acquired from a plurality of the Doppler lidars 5 and outputs the latitude, longitude and wind direction wind velocity data by minutes. That is, in an area where the observation ranges of a plurality of the Doppler lidars 5 overlap, the position-specific wind direction and wind velocity are calculated from position-specific (position by latitude and longitude) wind velocity of components in the line-of-sight direction of each Doppler lidar 5. Latitude-specific and longitude-specific (i.e., position-specific) outputs of these wind directions and wind velocities are the latitude, longitude and wind direction wind velocity data.

The dangerous wind condition area judgement section 123 judges an area where the wind velocity calculated by the position-specific wind condition data calculation section 122 exceeds a preliminarily set threshold value as a dangerous wind condition area. This dangerous wind condition area is judged in a three-dimensional region by latitude, longitude and altitude. In addition, this threshold value can be set as appropriate, for example, a wind velocity of 5 m/s. Also, this threshold value can be set as appropriate, such as setting the value to be the same everywhere uniformly, or setting the value to a threshold value of weaker wind velocity in urban areas where structures are dense and collision is more likely to occur than in rural areas where structures are less and collision is less likely to occur. In addition, the dangerous wind condition area judgement section 123 also executes judgement for an emergency landing necessity decision in which an emergency landing is instructed to all uninhabited aircrafts 6 in the area when the warning area is extensive or when extreme wind conditions such as tornadoes or gust of wind occur.

The warning area data output section 124 outputs the dangerous wind condition area judged by the dangerous wind condition area judgement section 123 as the warning area, and outputs an area requiring emergency landing as an emergency landing area. The warning area and the emergency landing area are three-dimensional areas consisting of latitude, longitude and altitude.

The observed wind condition data storage section 125 stores the position-specific wind condition data calculated by the position-specific wind condition data calculation section 122 together with observation time. In this way, the wind direction and wind velocity at the three-dimensional position are stored at each observation time (e.g. every minute).

The near-future wind condition data estimation section 126 estimates the position-specific wind direction and wind velocity up to 30 minutes ahead from the position-specific wind condition data of the most recent predetermined period stored in the observed wind condition data storage section 125, and outputs estimated wind condition data consisting of time, latitude, longitude, wind direction and wind velocity.

The off-limits area calculation section 127 refers to past position-specific wind condition data stored in the observed wind condition data storage section 125, and calculates an area that has become a warning area with a probability of being so at a predetermined rate or higher and an area where gust of wind is occurring at a predetermined rate or higher as off-limits areas. In addition, for an area designated by the operation terminal 4 or the like as an off-limits area to the uninhabited aircraft 6 for various reasons, the off-limits area calculation section 127 also makes it to be the off-limits area.

The off-limits area storage section 128 stores the off-limits area calculated by the off-limits area calculation section 127 as the off-limits area data. This off-limits area data is a three-dimensional area consisting of latitude, longitude and altitude.

The off-limits area output section 129 sends the off-limits data to the uninhabited aircraft 6. The uninhabited aircraft flight status management section 131 acquires the flight status including the transport item, the destination and the current position from the uninhabited aircraft 6 for management.

The control section 41 of the operation terminal 4 functions as a transport instruction input section 141 and a transport instruction output section 142. The transport instruction input section 141 receives input of transport item data indicating contents of the transport item, urgency data indicating whether or not the transport item is of high urgency, such as blood for emergency transfusion, destination data indicating the destination, and uninhabited aircraft identification data (ID) indicating the uninhabited aircraft 6 to be used for transport. The transport instruction output section 142 sends the transport item data, the urgency data and the destination data to the uninhabited aircraft 6 of the input uninhabited aircraft identification data.

The control section 71 of the uninhabited aircraft 6 functions as a warning area data acquisition section 161, a warning area passage judgement section 162, an emergency landing necessity judgement section 163, a path recalculation section 164, an emergency landing allowable area storage section 165, a transport instruction acquisition section 166, a path calculation section 167, a transport data storage section 168, an off-path judgement section 169, a flight status output section 171, a three-dimensional map data storage section 172, an off-limits area storage section 173, a flight control section 174 and a current position acquisition section 175.

The warning area data acquisition section 161 acquires the warning area data calculated by the management server 2.

The warning area passage judgement section 162 judges as to whether the warning area of the warning area data exists on a path stored in the transport data storage section 168 or not.

The emergency landing necessity judgement section 163 judges as to whether the emergency landing area exists on a path stored in the transport data storage section 168 or not.

The path recalculation section 164 recalculates the path to the destination according to input conditions. This path recalculation section 164 recalculates a path for flight to the destination without passing through the warning area when it is judged by the warning area passage judgement section 162 that the warning area is to be passed through, and recalculates a path for flight with the shortest distance to the nearest point which allows for emergency landing when it is judged by the emergency landing necessity judgement section 163 that the emergency landing area is to be passed through. In addition, the path recalculation section 164 recalculates the path to the destination also when deviation from the flight path occurred due to some factor.

The emergency landing allowable area storage section 165 stores emergency landing allowable area data indicating an area where emergency landing is allowable. This emergency landing allowable area can be appropriate data, indicating the area allowable for emergency landing, such as data by latitude, longitude and altitude or data by address, for example. For the emergency landing allowable area, area is set as appropriate, such as a rooftop of a building where landing is allowable.

The transport instruction acquisition section 166 acquires from the operation terminal 4 the transport item data indicating contents of the transport item and the destination data indicating the destination. The transport item data includes urgency data indicating whether or not the transport item is of high urgency.

The path calculation section 167 calculates a path which allows for flight to the destination acquired by the transport instruction acquisition section 166 based on map data stored in the three-dimensional map data storage section 172, and creates path data. This path which allows for flight is a three-dimensional flight path, which includes altitude in addition to latitude and longitude. Further, for example, this three-dimensional flight path may be in a form where three-dimensional map data comprising a plurality of two-dimensional map data including latitude and longitude in layers is stored for each altitude, and while making movement in a two-dimensional direction (horizontal direction) on an appropriate layer (altitude), layers (altitudes) are switched at an appropriate point to move in a two-dimensional direction (horizontal direction) on a switched layer (altitude). In addition, the three-dimensional path may be in a form where three-dimensional region consisting of latitude, longitude and altitude which allow for flight is stored as three-dimensional map data, and movement is made while the latitude, longitude and altitude are changed as needed such that points on the three-dimensional region are connected. Further, by making the three-dimensional map data as a multi-layered structure for each layer, the overall management can be facilitated, for example, by defining flight speed for each altitude. The path calculation section 167 calculates a path to the destination avoiding the off-limits area and the warning area (dangerous wind condition areas). In this connection, when the destination is in the off-limits area or the warning area, it is preferable that a configuration is made as undergoing an appropriate process such as configuring as to set the path without avoiding such off-limits area or the warning area, and when the off-limits area or the warning area is approached, wait on the spot or the nearest emergency landing area, and when the wind velocity in the off-limits area or the warning area falls below a predetermined threshold value, enter the area to fly to the destination, or output error as an undeliverable area to refuse to make it the destination. This allows to prevent a case in which, when the off-limits area or the warning area becomes the destination, the path is calculated and flight is started but final destination is not reached, and resulting in continuation of repeated recalculation of a path in the vicinity.

The transport data storage section 168 stores transport item data, destination data, path data, and the current position. Among them, for the transport item data and the destination data, initially set data is stored, the path data is updated and stored each time the path is calculated by the path calculation section 167 and the path recalculation section 164, and the current position is updated each time the current position is acquired by the current position acquisition section 175.

The off-path judgement section 169 judges whether the current position data exists on the path data or not in three dimensions of latitude, longitude and altitude. When the data is off the path, the off-path judgement section 169 sends the current position to the path recalculation section 164.

The flight status output section 171 sends the transport item data, the destination data and the current position to the management server 2. This enables the management server 2 to keep track of all the flight status of the uninhabited aircraft 6.

The three-dimensional map data storage section 172 stores the three-dimensional map data. As described above, this three-dimensional map data may be data such as three-dimensional map data in which two-dimensional map data consisting of latitude and longitude is in a multi-layered structure for each layer (altitude), or three-dimensional map data indicating the area which allows for flight in three dimensions of latitude, longitude and altitude, as appropriate.

The off-limits area storage section 173 stores the off-limits area data received from the management server 2.

Based on the destination data and path data stored in the transport data storage section 168, the current position data acquired by the current position acquisition section 175, the azimuth data acquired from the internally held azimuth sensor 63 (refer to FIG. 1) and the attitude data acquired from the attitude sensor 67, the flight control section 174 sends the flight data to the attitude control section 72 (refer to FIG. 1) to fly along the path of the path data. This flight data includes movement speed and movement direction. Upon receiving this flight data, the attitude control section 72 (refer to FIG. 1) controls a plurality of motors 81 (refer to FIG. 1) to fly at the specified speed and to the specified direction.

The current position acquisition section 175 acquires current position data indicating the current position (latitude, longitude and altitude) by the GPS unit 61 (refer to FIG. 1) and the altitude sensor 62 (refer to FIG. 1).

Figure 3:
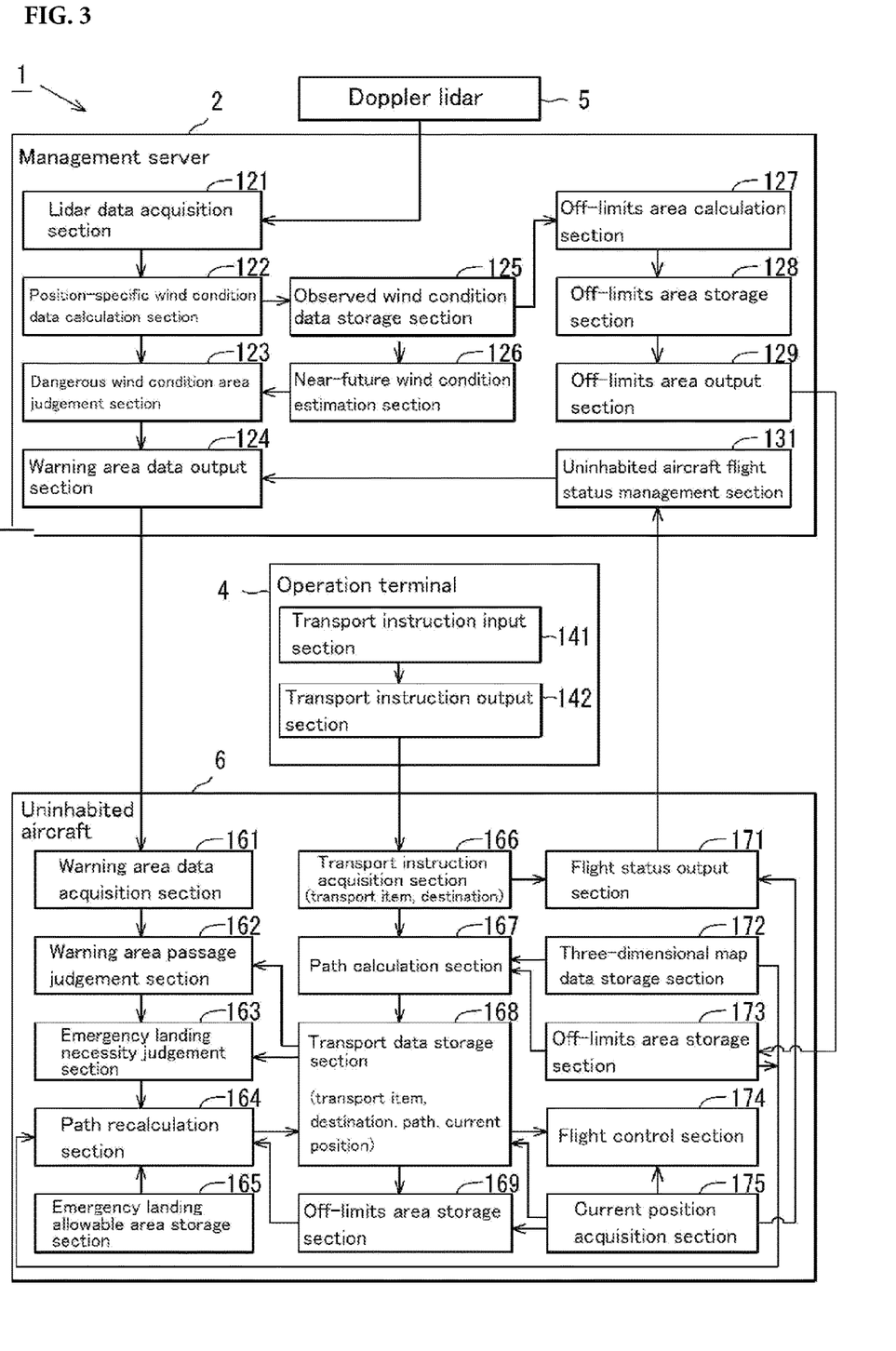
FIG. 3 is a functional block diagram of wind condition detection functions executed by a control section of the management server.

FIG. 3 is a functional block diagram showing wind condition detection functions executed by the control section 21 of the management server 2 with a management program 28. Further, the process according to the functional block shown in FIG. 3 is executed in units of range defined by direction and distance, and repeated for all ranges.

A data organizing section 231 acquires spectrum data from the reflected light data for organization. That is to say, the data organizing section 231 performs operations such as, when the reflected light data is valid data, keep processing so that data can be stored, and in a case of reflected light data with missing measurements more than a predetermined amount thereof and in a case of no data, not storing data in a spectrum FIFO bank, a parameter FIFO bank, and a valid data number FIFO bank.

Further, the spectrum FIFO bank stores NS pieces of altitude and frequency information for each beam direction, adds newly acquired data and when NS pieces is exceeded, deletes data in chronological order. The parameter FIFO bank stores NP pieces of altitude and peak power, altitude and Doppler shift, altitude and spectrum width and altitude and SQSUM data respectively for each beam direction, adds newly acquired data, and when NP pieces is exceeded, deletes data in chronological order. The valid data number FIFO bank stores validity or invalidity of data acquired in the past for each beam number, which is stored in order from latest data such as from first previous data, second previous data and so on, and data is added anytime when there is new data.

In addition, the data organizing section 231 proceeds the process to a valid parameter data calculation section 234 when there is no problem in the spectrum data of the reflected light data, and otherwise, proceeds the process to a noise level estimation section 232.

The noise level estimation section 232 estimates a level of noise existing in the spectrum data of the reflected light data. The noise level can be estimated by an appropriate method, such as by estimating based on a predetermined value that is preliminarily defined, or by estimating an area where number of peaks become a predetermined number or more as the noise level.

An average spectrum intensity estimation section 233 estimates average spectrum intensity from spectrum of the acquired reflected light data. This may be estimated by an appropriate method for estimation, such as by preliminarily estimating from past data or by acquiring an average value of spectrum intensities from present data.

The valid parameter data calculation section 234 calculates valid parameters from spectrum data of the reflected light data. These parameters may be parameters such as altitude and peak power, altitude and Doppler shift, altitude and spectrum width, altitude and SQUS, and so on, as appropriate. Having calculated the parameters in this manner, the valid parameter data calculation section 234 passes the process to an initial fitting value estimation section 235 for estimating an initial fitting value.

The initial fitting value estimation section 235 has an estimation method decision section 236, an initial value estimation section from spectrum 237 (spectrum initial value estimation process), an initial value estimation section from parameter 238 (parameter initial value estimation process), and a re-estimation necessity decision section 239 (fitting redo decision section).

The estimation method decision section 236 decides whether the initial value should be decided from the spectrum or the parameter. Specifically, if peaks in the spectrum of the previous observation data (or average data of a plurality of observations) stored in the spectrum FIFO bank are set number which has been preliminarily set or less (for example, less than or equal to one), the initial value is decided to be estimated from spectrum of the previous observation data, and if not, the initial value should be decided from parameters of the previous observation.

The initial value estimation section from spectrum 237 estimates the initial value from spectrum of average data of a plurality of past observation data. In this initial value estimation, the spectrum is directly used as the initial value. The past observation data to be averaged here can be predetermined numbers from the most recent, and may be all the observation data stored in the spectrum FIFO bank.

The initial value estimation section from parameter 238 estimates the initial value from average values of the parameters of a plurality of observation data stored in the parameter FIFO bank. In this initial value estimation from parameter, each of average values of parameters of a plurality of times of prescribed numbers from the most recent may be used as the initial value, and may be the average value of all the data in the parameter FIFO bank.

Thus, by having the initial value estimation section from spectrum 237 or the initial value estimation section from parameter 238 estimate the initial value from the most recent observation data, an appropriate analysis can be achieved by taking advantage of a fact that atmospheric condition does not change that much as long as position (point) is the same.

The re-estimation necessity decision section 239 judges whether the initial value estimated by the initial value estimation section from spectrum 237 or the initial value estimation section from parameter 238 is appropriate or not, and if it is appropriate, it is adopted as is, and if it is inappropriate, the initial value is estimated again. Specifically, when the initial value estimated from parameter is not within a predetermined allowable range or the number of peaks in the initial value estimated from spectrum is not within predetermined allowable numbers, the process is returned to the estimation method decision section 236 to redo the process.

Thus, for example, in a case where an initial value is estimated by the initial value estimation section from parameter 238 because the number of peaks in the spectrum is the predetermined value or less, but the estimated initial value is not within the predetermined proper range or is missing, etc., the estimation can be redone again to estimate the initial value by the initial value estimation section from spectrum 237. In this way, accuracy of later fitting can be improved by setting an initial value as favorable as possible based on the past observation data.

A fitting execution section 241 (fitting processing section) executes fitting utilizing the decided initial value. This fitting may be performed by an existing appropriate fitting process, and this example uses Gaussian fitting where a least-squares method is utilized.

A fitting result examination section 242 examines whether fitting result is appropriate or not, and if it is appropriate, it proceeds to a next process, but if it is inappropriate, the process is returned to the valid parameter data calculation section 234 or the fitting execution section 241, depending on its contents.

A result smoothing section 243 (obstacle-derived peak judgement section and obstacle-derived peak elimination section) removes obstacle-derived peaks. Thus, a spectrum without peaks caused by obstacles can be acquired.

The result smoothing section 243 also executes a singularity correction process for correcting results when the results seen on a range-by-range basis are inappropriate. In detail, since atmospheres in areas close to each other move in a similar manner, a range next to a certain range (or a range in the vicinity of a predetermined extent), i.e., at neighboring direction or neighboring distance or neighboring height, the atmospheres do not change that much. Thus, for a certain range as seen from the Doppler Lidar 5, despite that data on one neighbor (data neighboring on distance in the front, neighboring on one direction, or neighboring on one height) and data on the other neighbor (data neighboring on distance in the back, neighboring on the other direction, or neighboring on the other height) are close in value, data of a range therebetween is distant, data of this range is removed and changed to an intermediate value between the data neighboring on distance in the front and the data neighboring on distance on the back, by interpolation. The data compared and interpolated here can be appropriate data, such as a peak value or wind information such as wind velocity. By the observation data with interpolated value thus assigned, inappropriate data due to noise can be reduced, and appropriate and accurate analysis can be performed.

A data storage section 244 adds a spectrum in which the obstacle-derived peak is cut, to the spectrum FIFO bank as observation data, adds the parameters acquired by the valid parameter data calculation section 234 to the parameter FIFO bank, and adds validity/invalidity of each of these data to the valid data number FIFO bank to store the latest data. Further, in addition to these FIFO banks, it is preferable to accumulate the same data (spectra and parameters) in an appropriate database. This allows accumulation of past observation data and also allows for reference to past information that has been deleted from spectrum FIFO bank and parameter FIFO bank.

In addition, the above-mentioned re-estimation necessity decision section 239 extracts clutter data by a clutter data extraction section 245 as a process of a display system. The clutter data due to structures and flying objects can be extracted thereby.

A fixed object identification section 246 identifies a fixed object (obstacle) from cracks extracted by the above clutter data extraction section 245. In other words, since the position where the clutter exists is the position where the structure or the flying object exists, the fixed object is identified and displayed for making it easily understandable to users.

A monitor output section 247 displays on a monitor the observed spectrum data and the like on the display section 24 (see FIG. 1) together with the position of the fixed object identified by the above fixed object identification section 246. This makes it possible to superimpose the wind conditions such as wind velocity and the position of an obstacle object such as a building for display, and thus, easy understanding is allowed for users.

With this configuration, the management server 2 can detect Doppler shift of the aerosol with high accuracy and observe the wind conditions. In addition, it can detect dangerous wind conditions such as turbulence, building wind and gusty areas, and can output latitude, longitude, intensity of turbulence, wind direction and wind velocity, and warning dimension information related to the detected dangerous wind conditions and their positions. Specifically, an area where the wind velocity exceeds a preliminarily set value is defined as a dangerous wind condition area. The threshold value is set to an appropriate value, such as a wind velocity of at least 5 m/s or more.

In addition, in an area where only one Doppler lidar 5 is used for observation, the latitude, longitude, and line-of-sight wind information for each observation range can be acquired, and in an area where two or more Doppler lidars 5 are used for observation, the latitude, longitude, and wind direction and wind velocity information can be acquired by combining the line-of-sight wind vectors observed by each of the Doppler lidars 5. For this reason, the threshold values may be varied depending on whether or not the wind direction information can be acquired, where the threshold value in the area observed by only one Doppler lidar 5 can be set less than the threshold value in the area observed by two or more Doppler lidars 5.

The detection of such dangerous wind conditions is preferably performed on a minute-by-minute basis, such as every minute.

Figure 4:
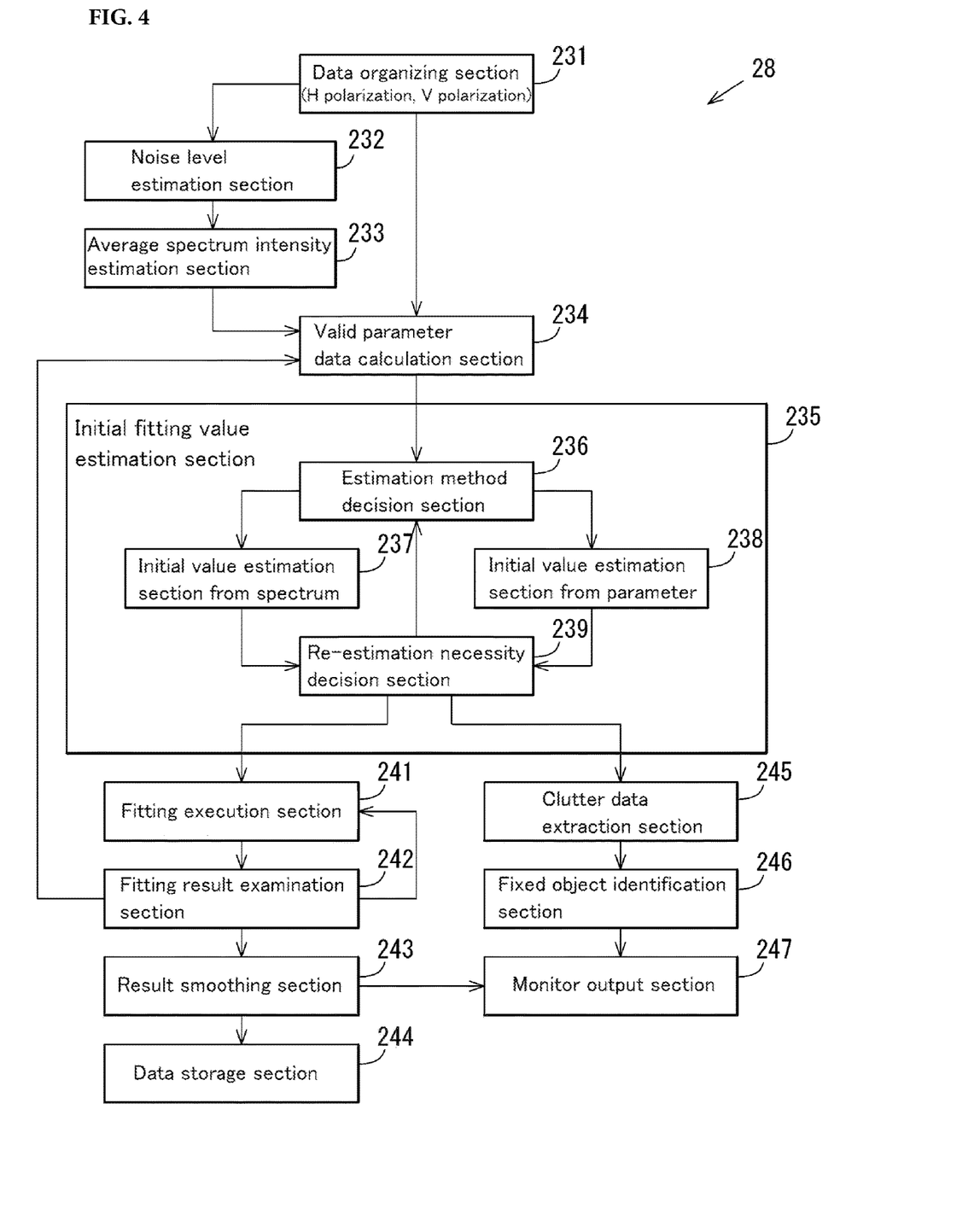
FIG. 4 is a flowchart showing operations of the management server and the uninhabited aircraft.

FIG. 4 is a flowchart showing the operation executed by the control section 21 of the management server 2 and the control section 71 of the uninhabited aircraft 6 (refer to FIG. 1).

The control section 21 constantly detects wind conditions using the wind condition detection function described above, and while no dangerous wind conditions are detected (Step S1: No), it continues to detect wind conditions without sending an alert (Step S2).

When a dangerous wind condition is detected (Step S1: Yes), the control section 21 assimilates observed real-time wind condition to a high-resolution numerical model (Step S3).

The control section 21 calculates a near-future wind condition with resolution of meter order (in units of 1 m$^2$) (Step S4). In this connection, the near-future wind condition refers to predicted wind condition at a preliminarily set appropriate future time, such as, for example, of 3 minutes later, 5 minutes later, 10 minutes later, 30 minutes later, an hour later, or 2 hours later. In this example, the near future wind condition of 30 minutes later is predicted.

The control section 21 sends real-time status and prediction information and an alert to the uninhabited aircraft 6 in flight (Step S5). In other words, the control section 21 sends current dangerous wind condition area data which indicates an area of current dangerous wind conditions (latitude, longitude and warning dimension), near-future dangerous wind condition area data which indicates an area that is expected to become dangerous wind condition in the near future (latitude, longitude and warning dimension) and alert signals to call attention to each inhabited aircraft 6.

The alert signal is preferably a multi-stage alert signal that indicates a level of danger in stages according to the wind velocity, such as, for example, as the wind velocity increases, the level of danger gets higher in stages, from low danger, medium danger to high danger. It is also preferred that the uninhabited aircraft 6 which receives the alert signal is set to operate for any stage of the alert signal according to its own flight capability. This allows for deciding responses according to the flight capacity of the uninhabited aircraft 6 and the wind velocity conditions, such as, for example, if the uninhabited aircraft 6 is large, low-risk areas are directly passed through, and if the uninhabited aircraft 6 is small, even low-risk areas are avoided. In addition, in this gradual approach, extensive warning area or extreme wind conditions such as tornadoes or gust of wind is considered as highly dangerous level, and in such highly dangerous level, respondence according to the wind conditions, such as an emergency landing of the uninhabited aircraft 6 in the vicinity etc. may be made.

In this connection, appropriate setting can be made for a target for sending, such as, sending all of the above-mentioned current dangerous wind condition areas and near-future dangerous wind condition areas to all uninhabited aircrafts 6, or sending only the current dangerous wind condition area and near-future dangerous wind condition area on the path of the uninhabited aircraft 6 to only the uninhabited aircraft 6 having the above-mentioned present dangerous wind condition area or near-future dangerous wind condition area on its path.

The control section 71 of the uninhabited aircraft 6 continues flight (Step S11) if the current position is not within the received area (Step S6: No).

If the current position is within the received area (Step S6: Yes), the control section 71 checks whether a package being transported is a matter of emergency or not (Step S7).

If the package being carried is a matter of non-emergency (Step S7: No), the control section 71 refers to the emergency landing allowable area storage section 165 (see FIG. 2) and lands on an emergency landing allowable area closest to the current position (Step S8).

If the package being transported is the matter of emergency (Step S7: Yes), the control section 71 judges whether it is necessary to reset a route (Step S9) because of urgent need to transport the item. In this determination of necessity for resetting the route, it is determined as necessary if there is a current dangerous wind condition area or near-future dangerous wind condition area on the path, and if there is no current dangerous wind condition area or near-future dangerous wind condition area on the path, it is determined as not necessary.

If resetting of the route is unnecessary (Step S9: No), the control section 71 reports the position information and allows a relay by a manager (Step S10). Therefore, here, the control section 71 continues the flight.

If resetting of the route is necessary (Step S9: Yes), the control section 71 continues the flight (Step S11). In this case, the control section 71 resets the route by the path recalculation section 164 (refer to FIG. 2) and continues the flight with the reset path.

The above configuration and operation allow the uninhabited aircraft 6 to fly without the need of human control, and considering the effects of the wind. In other words, if the dangerous wind condition area (current dangerous wind condition and near-future dangerous wind condition area) exists on the path, the path may be recalculated and avoided, or make an emergency landing and wait until the dangerous wind condition is resolved.

In addition, an emergency landing area is preliminarily defined, and when the warning area due to wind is extensive or when under extreme wind conditions, such as tornadoes or gust of wind, emergency landing instruction is given to allow for waiting until the dangerous wind conditions are resolved to restart thereafter.

In addition, when the item being transported by the uninhabited aircraft 6 is of high urgency such as blood for emergency transfusion, an emergency landing is not made even if it is instructed to do so, and the path can be recalculated to allow for the highly urgent transport item to be delivered reliably and quickly. Here, the risk of a collision with another uninhabited aircraft 6 due to strong wind made by an uninhabited aircraft 6 transporting less urgent items, making an emergency landing, is greatly reduced, and thus, relatively safe flight is available.

In addition, the number of path recalculations and emergency landings can be reduced and stable flights are enabled by preliminarily defining areas that were often subjected to dangerous wind conditions in the past as the off-limits area and removing them from the paths.

In addition, because the path is calculated by estimating wind conditions in the near future and avoiding predicted warning area which is to be a warning area, situations, in which a position where an aircraft is flying becomes the warning area, can be reduced.

Further, the flight path calculation system of the present invention corresponds to the uninhabited aircraft flight management system 1 of the embodiment, and in the same manner, a computer corresponds to the uninhabited aircraft 6,
a flight path calculation program corresponds to the flight program 77,
a wind condition data acquisition section corresponds to the lidar data acquisition section 121,
a warning area calculation section corresponds to the dangerous wind condition area judgement section 123,
an emergency landing instruction section corresponds to the warning area data output section 124,
a wind condition estimation section corresponds to the near-future wind condition estimation section 126, an off-limits area calculation means corresponds to the off-limits area calculation section 127,
a warning area acquisition section corresponds to the warning area data acquisition section 161,
an emergency judgement section corresponds to the emergency landing necessity judgement section 163,
a three-dimensional path recalculation section corresponds to the path recalculation section 164,
an emergency landing allowable area storage section corresponds to the emergency landing allowable area storage section 165,
a destination acquisition section corresponds to the transport instruction acquisition section 166,
a three-dimensional path calculation section corresponds to the path calculation section 167,
a transport item urgency data storage section corresponds to the transport data storage section 168,
a three-dimensional map data storage section corresponds to the three-dimensional map data storage section 172, and
a current position acquisition section corresponds to the current position acquisition section 175,
but the present invention can be embodied in various other embodiments, not limited to this.

For example, the management server 2 is configured to perform all of the detection of wind conditions, prediction of near-future wind conditions and flight management of the uninhabited aircraft 6, but may be configured separately as a wind condition detection server for detecting wind conditions, a wind condition prediction server for predicting near-future wind conditions and a flight management server for managing flight of the uninhabited aircraft 6, respectively.

INDUSTRIAL APPLICABILITY

The present invention can be used in a variety of industries that utilize uninhabited aircrafts.

REFERENCE SIGNS LIST

1: Uninhabited aircraft flight management system
6: Uninhabited aircraft
77: Flight program
121: Lidar data acquisition section
123: Dangerous wind condition area judgement section
124: Warning area data output section
126: Near-future wind condition estimation section
127: Off-limits area calculation section
161: Warning area data acquisition section
163: Emergency landing necessity judgement section
164: Path recalculation section
165: Emergency landing allowable area storage section
166: Transport instruction acquisition section
167: Path calculation section
168: Transport data storage section
172: Three-dimensional map data storage section
175: Current position acquisition section

The invention claimed is:

1. A flight path calculation system comprising:
at least one processor;
a first storage storing computer readable instructions;
a second storage for storing three-dimensional map data in horizontal and height directions at which no ground objects exist and an uninhabited aircraft is allowed to fly; and
a third storage for storing an emergency landing allowable area in which the uninhabited aircraft can make an emergency landing;
wherein the computer readable instructions, when executed by the at least one processor, cause the flight path calculation system to:
acquire, by the at least one processor, a current position of the uninhabited aircraft;
acquire, by the at least one processor, a destination of the uninhabited aircraft;
calculate, by the at least one processor, a path which allows for flight in the map data from the current position to the destination;
acquire, by the at least one processor, wind condition data;
calculate, by the at least one processor, a warning area in which flight should be avoided, from the wind condition data;
recalculate, by the at least one processor, the path avoiding the warning area, when the path previously calculated is a path which passes through the warning area;
give, by the at least one processor, an emergency landing instruction to the uninhabited aircraft in flight to make an emergency landing on the emergency landing allowable area;
recalculate, by the at least one processor, the path from the current position to the emergency landing area when the emergency landing instruction is given;
store, by the at least one processor, transport item urgency data by which the transport item of the uninhabited aircraft can be distinguished as to whether the transport item is an urgent transport item; and
judge, by the at least one processor, whether the transport item urgency data related to the uninhabited aircraft which is made to make the emergency landing indicates the transport item is of high urgency;
wherein the flight path calculation system is configured such that, when the transport item is judged as being of high urgency, the emergency landing instruction is not given and flight of the uninhabited aircraft is continued.

2. The flight path calculation system according to claim 1, further comprising:
calculating, by the at least one processor, an off-limits area which is likely to have effect on flight and where flight should be avoided, based on a past data of the wind condition data;
wherein said calculating and recalculating of the path is performed avoiding the off-limits area.

3. The flight path calculation system according to claim 1, further comprising:
estimating, by the at least one processor, an expected warning area which becomes a warning area where flight should be avoided in near future based on a past data of the wind condition data and a latest data of the wind condition data;
wherein said calculating and recalculating of the path is performed avoiding the expected warning area.

4. The flight path calculation system according to claim 2, further comprising:
estimating, by the at least one processor, an expected warning area which becomes a warning area where flight should be avoided in near future based on a past data of the wind condition data and a latest data of the wind condition data;

wherein said calculating and recalculating of the path is performed avoiding the expected warning area.

5. A non-transitory computer-readable storage medium encoded with computer-readable program code having computer-readable instructions which, when executed by a computer system including at least one processor, causes the computer system to function as a flight path calculation system which executes a method comprising:

storing, by at least one processor, three-dimensional map data in horizontal and height directions at which no ground objects exist and where an uninhabited aircraft is allowed to fly;

acquiring, by the at least one processor, a current position of the uninhabited aircraft;

acquiring, by the at least one processor, a destination of the uninhabited aircraft;

calculating, by the at least one processor, a path which allows for flight in the map data from the current position to the destination;

acquiring, by the at least one processor, a warning area determined from wind condition data that flight should be avoided;

recalculating, by the at least one processor, the path avoiding the warning area when the path previously calculated is a path which passes through the warning area;

storing, by the at least one processor, an emergency landing allowable area at which the uninhabited aircraft can make an emergency landing;

giving, by the at least one processor, an emergency landing instruction to the uninhabited aircraft in flight to make an emergency landing on the emergency landing allowable area;

recalculating, by the at least one processor, the path from the current position to the emergency landing area when the emergency landing instruction is given;

storing, by the at least one processor, transport item urgency data by which the transport item of the uninhabited aircraft can be distinguished as to whether the transport item is an urgent transport item; and judging, by the at least one processor, whether the transport item urgency data related to the uninhabited aircraft which is made to make the emergency landing indicates the transport item is of high urgency;

wherein the at least one processor is configured such that, when the transport item is judged as being of high urgency, the emergency landing instruction is not given and flight of the uninhabited aircraft is continued.

6. A computer-implemented method for controlling an uninhabited aircraft path, the method comprising:

storing, at least one processor, three-dimensional map data in horizontal and height directions at which no ground objects exist and where an uninhabited aircraft is allowed to fly;

acquiring, the at least one processor, a current position of the uninhabited aircraft;

acquiring, by the at least one processor, a destination of the uninhabited aircraft;

calculating, by the at least one processor, a path which allows for flight in the map data from the current position to the destination;

acquiring, by the at least one processor, wind condition data;

calculating, by the at least one processor, a warning area in which flight should be avoided, from the wind condition data;

recalculating, by the at least one processor, the path avoiding the warning area when the path previously calculated is a path which passes through the warning area;

storing, by the at least one processor, an emergency landing allowable area at which the uninhabited aircraft can make an emergency landing;

giving, by at least one processor, an emergency landing instruction to the uninhabited aircraft in flight to make an emergency landing on the emergency landing allowable area;

recalculating, by the at least one processor, the path from the current position to the emergency landing area when the emergency landing instruction is given;

storing, by the at least one processor, transport item urgency data by which the transport item of the uninhabited aircraft can be distinguished as to whether the transport item is an urgent transport item; and judging, by the at least one processor, whether the transport item urgency data related to the uninhabited aircraft which is made to make the emergency landing indicates that the transport item is of high urgency;

wherein, when the transport item is judged as being of high urgency, the emergency landing instruction is not given and flight of the uninhabited aircraft is continued.

* * * * *